UNITED STATES PATENT OFFICE.

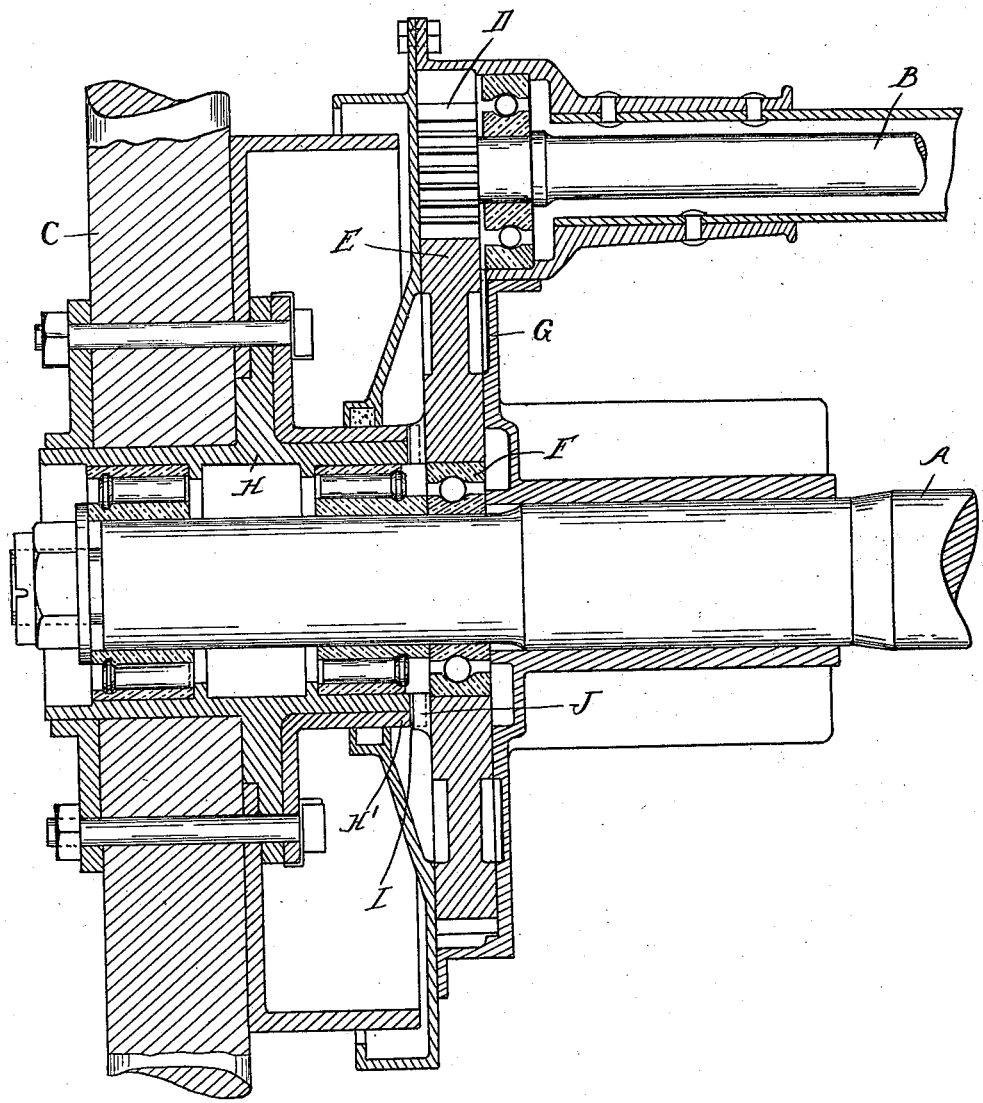

ALANSON P. BRUSH, OF DETROIT, MICHIGAN.

VEHICLE DRIVE-AXLE.

1,401,581. Specification of Letters Patent. Patented Dec. 27, 1921.

Application filed March 8, 1917. Serial No. 153,520.

*To all whom it may concern:*

Be it known that I, ALANSON P. BRUSH, a citizen of the United States of America, residing at Detroit, in the county of Wayne and State of Michigan, have invented certain new and useful Improvements in Vehicle Drive-Axles, of which the following is a specification, reference being had therein to the accompanying drawings.

The invention relates to axles of that type provided with a jack-shaft and a transmission connection between the same and the vehicle wheels. The invention consists in the novel construction of the transmission connection, which permits of the removal and replacement of the vehicle wheel without disassembling the transmission or removing the same from its protecting housing.

In the drawings:

The figure is a longitudinal section through the axle in the plane of the jack-shaft.

A is the axle, B is the jack-shaft and C is the vehicle wheel. My improved transmission comprises a pinion D upon the jack-shaft and a spur-gear E arranged concentric to the axle. This gear-wheel is mounted upon a roller bearing F upon the axle and is retained in its driving plane by a housing G surrounding the same and the pinion D. The vehicle wheel C is provided with a hub H removably mounted upon the axle A, and having a portion H' which extends inwardly into the housing G and provided with clutch jaws I for engaging corresponding jaws J upon the gear-wheel E. The arrangement is such that whenever the vehicle wheel is placed in position upon the axle the jaws I and J will engage with each other and will thereby form a coupling for imparting the torque from the gear-wheel to the hub. On the other hand, whenever it is desired to remove the vehicle wheel this may be effected without dismounting the transmission or opening the housing G which incloses the same.

What I claim as my invention is:

The combination with an axle, of a jack-shaft arranged parallel thereto, a pinion on said jack-shaft, a spur gear wheel in mesh with said pinion and arranged concentric to said axle, a journal bearing for said spur-gear wheel upon said axle, a vehicle wheel detachably mounted upon said axle and having a detachable driving engagement with said spur-gear wheel, and anti-friction means upon said axle for supporting said vehicle wheel independently of said journal bearing.

In testimony whereof I affix my signature.

ALANSON P. BRUSH.